United States Patent
Sahita et al.

(10) Patent No.: US 7,536,479 B2
(45) Date of Patent: May 19, 2009

(54) LOCAL AND REMOTE NETWORK BASED MANAGEMENT OF AN OPERATING SYSTEM-INDEPENDENT PROCESSOR

(75) Inventors: Ravi Sahita, Beaverton, OR (US); Priya Rajagopal, Wharton, NJ (US); David Durham, Hillsboro, OR (US); Scott Hahn, Beaverton, OR (US); Carey Smith, Hillsboro, OR (US); Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 10/985,123

(22) Filed: Nov. 9, 2004

(65) Prior Publication Data

US 2006/0098646 A1 May 11, 2006

(51) Int. Cl.
*G06F 15/16* (2006.01)
(52) U.S. Cl. .................. 709/245; 709/250; 709/223; 709/230; 370/389; 370/248
(58) Field of Classification Search ........... 709/250, 709/223, 230, 238, 245; 370/389, 428
See application file for complete search history.

(56) References Cited

U.S. PATENT DOCUMENTS

| | | | |
|---|---|---|---|
| 6,728,232 B2 * | 4/2004 | Hasty et al. ............... 370/338 |
| 6,925,079 B2 * | 8/2005 | Matsukawa ................ 370/389 |
| 6,928,478 B1 * | 8/2005 | Gangadharan ............. 709/226 |
| 7,125,119 B2 * | 10/2006 | Farberov .................... 351/219 |
| 7,143,188 B2 * | 11/2006 | Maufer et al. ............... 709/245 |
| 2002/0161918 A1 * | 10/2002 | Asano et al. ................ 709/238 |
| 2003/0145104 A1 * | 7/2003 | Boden et al. ................ 709/238 |
| 2003/0189905 A1 * | 10/2003 | Lee ............................ 370/254 |
| 2004/0030804 A1 * | 2/2004 | Wiget et al. ................ 709/245 |
| 2005/0015469 A1 * | 1/2005 | Zuberi ....................... 709/220 |
| 2005/0188102 A1 * | 8/2005 | Madajczak ................. 709/238 |
| 2007/0299987 A1 * | 12/2007 | Parker et al. ............... 709/246 |

* cited by examiner

*Primary Examiner*—John Follansbee
*Assistant Examiner*—Anthony Mejia
(74) *Attorney, Agent, or Firm*—Libby H. Hope

(57) ABSTRACT

In one embodiment, a method is provided. The method of this embodiment provides receiving one or more packets that are addressed to an alternate IP (Internet Protocol) address and that include a LADLC (local application data link control) address in a system having an operating system-independent processor ("service processor") associated with the alternate IP address and an alternate DLC address, and an embedded network stack ("ENS") of the service processor associated with a primary IP address; performing filtering to determine if the LADLC address matches the alternate DLC address; and if the LADLC address matches the alternate DLC address, then replacing the alternate IP address of the one or more packets with the primary IP address, and forwarding the one or more packets to the ENS.

30 Claims, 3 Drawing Sheets

LOCAL AND REMOTE NETWORK BASED MANAGEMENT OF AN OPERATING SYSTEM-INDEPENDENT PROCESSOR

FIELD

Embodiments of this invention relate to local and remote network based management of an operating system-independent processor.

BACKGROUND

Manageability refers to a system's ability to enable remote and local management, which may include, for example, system diagnostics, software updates, and/or system inventory. One way to achieve manageability is to use operating system-independent processors (hereinafter "service processors"). Service processors refer to auxiliary processors on a system that may operate independently of the operating system. This enables systems to be managed whether or not the operating system is working.

Systems may be managed via management applications. A "management application" refers to a program that may access and manage the system. Sometimes, it is important for management applications to work locally (within the system) as well as remotely (over a network). However, current network protocols present some challenges to this requirement.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
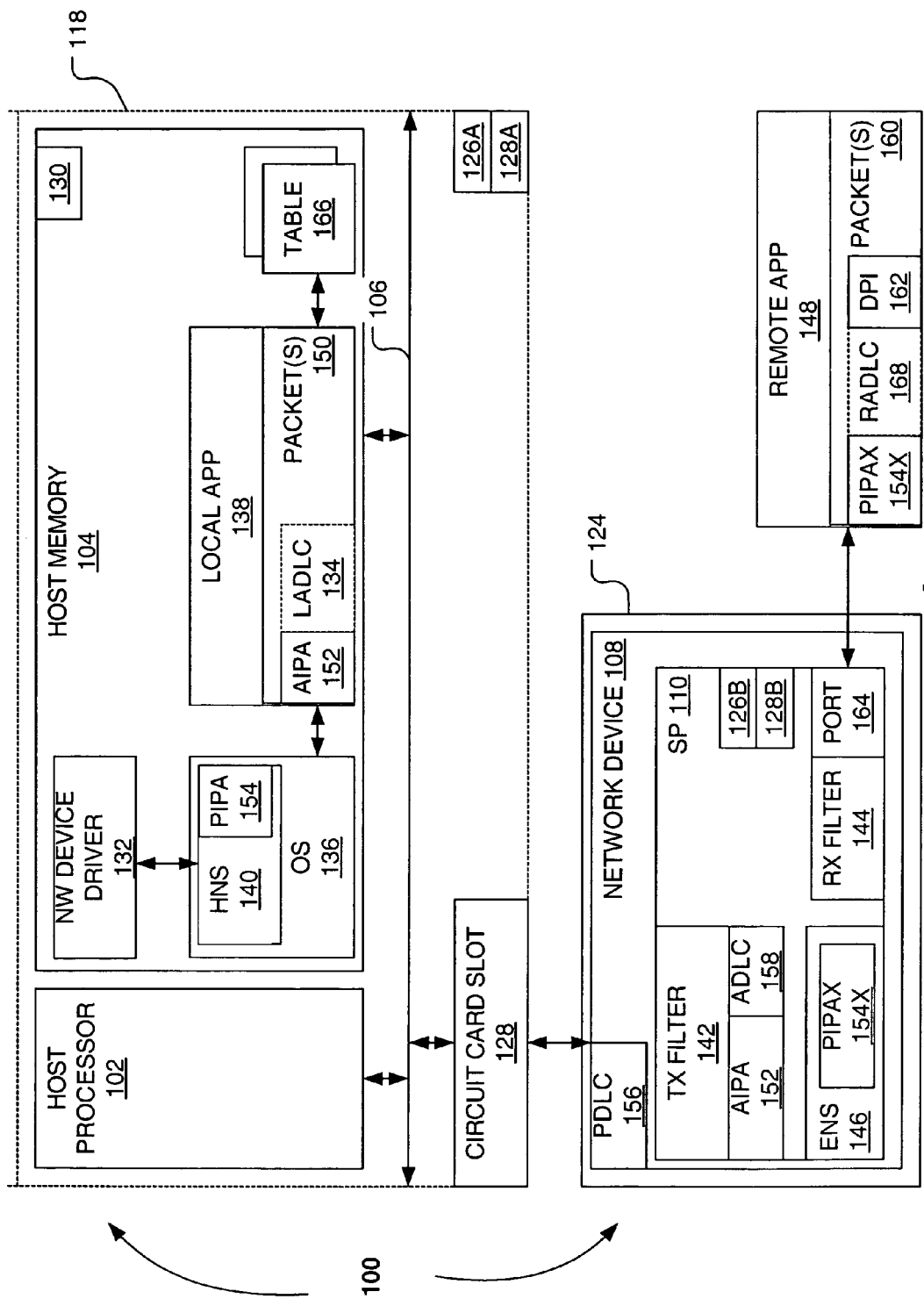
FIG. 1 illustrates a system embodiment.

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Embodiments of the present invention may be provided, for example, as a computer program product which may include one or more machine-accessible media having machine-executable instructions that, when executed by one or more machines such as a computer, network of computers, or other electronic devices, may result in the one or more machines carrying out operations in accordance with embodiments of the present invention. A machine-accessible medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable media suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout this document, various acronyms are used to reference the elements described herein. TABLE 1 summarizes these acronyms, associated descriptions, and associated reference numerals.

| ACRONYM | DESCRIPTION | REFERENCE NUMERAL |
|---------|-------------|-------------------|
| SP | Service processor | 110 |
| ENS | Embedded network stack | 146 |
| PDLC | Primary DLC (Data Link Control) address | 156 |
| ADLC | Alternate DLC address | 158 |
| LADLC | Local application DLC address | 134 |
| RADLC | Remote application DLC address | 168 |
| PIPA | Primary IP (internet protocol) address | 154 |
| PIPAX | Primary IP other address | 154X |
| AIPA | Alternate IP address | 152 |
| DPI | Dedicated port identifier | 162 |

FIG. 1 illustrates a system in one embodiment. System 100 may comprise host processor 102, host memory 104, bus 106, and a network device 108. System 100 may comprise more than one, and other types of processors, memories, buses, network devices, and service processors; however, those illustrated are described for simplicity of discussion. Host processor 102, host memory 104, and bus 106 may be comprised in a single circuit board, such as, for example, a system motherboard 118. Rather than reside on circuit card 124, network device 108 may instead be comprised on system motherboard 118. Furthermore, system may comprise other components. For example, system 100 may further include other types of memories (not shown), such as flash memory, and one or more chipsets (not shown), including an I/O (input/output) controller hub to control communications among system 100 components.

Host processor 102 may comprise, for example, an Intel® Pentium® microprocessor that is commercially available from the Assignee of the subject application. Of course, alternatively, host processor 102 may comprise another type of microprocessor, such as, for example, a microprocessor that is manufactured and/or commercially available from a source other than the Assignee of the subject application, without departing from this embodiment.

Bus 106 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, for example, bus 106 may comprise a bus that complies with the PCI Express Base Specification, Revision 1.0a, Apr. 15, 2003 available from the PCI Special Interest Group (hereinafter referred to as a "PCI Express bus"). Bus 106 may comprise other types and configurations of bus systems.

Host memory 104 may store machine-executable instructions 130 that are capable of being executed, and/or data capable of being accessed, operated upon, and/or manipulated by circuitry, such as circuitry 126A. Host memory 104 may, for example, comprise read only, mass storage, random access computer-accessible memory, and/or one or more other types of machine-accessible memories. The execution of program instructions 130 and/or the accessing, operation upon, and/or manipulation of this data by, for example, circuitry 126A may result in, for example, circuitry 126A carrying out some or all of the operations described herein.

Host memory 104 may comprise operating system 136 (labeled "OS"), local application 138 (labeled "LOCAL APP"), and network device driver 132 (labeled "NW device driver"). Network device driver 132 may control one or more network devices 108, and may interface with host network stack 140 to process packets. As used herein, a "packet" refers to a sequence of one or more symbols and/or values that may be encoded by one or more signals transmitted from at least one sender to at least one receiver.

Operating system 136 may comprise a host network stack 140 (labeled "HNS"). Host network stack 140 may comprise one or more programs and protocols for processing packets. For example, host network stack 140 may process packets in accordance with the OSI (Open System Interconnection). model for networking protocols. In response to receiving one or more packets, system 100 (and/or one or more components within system 100) may process one or more packets by examining the packet one layer at a time. For example, depending on the direction in which one or more packets are traveling, system 100 may examine one or more packets for an Internet protocol address at the Network Layer (also known as layer 3), and then MAC (Media Access Control) address at the Data Link layer (also known as layer 2), or vice versa (this may be in addition to checking one or more other layers in accordance with whatever standard is being followed). The OSI model is defined by the International Organization for Standardization (ISO) located at 1 rue de Varembé, Case postale 56 CH-1211 Geneva 20, Switzerland. However, embodiments of the invention are not limited to this standard.

Network device 108 may comprise service processor 110 (hereinafter "SP"). SP 110 may be an operating-system independent processor that may operate regardless of the state of the operating system 136. SP 110 may comprise an embedded network stack 146 (hereinafter "ENS") to process packets 150, 160 sent from local application 138 to SP 110 or from remote application 148 sent to SP 110, respectively. ENS 146 is a network stack dedicated to SP 110, and may process one or more packets forwarded to SP 110.

Rather than reside on network device 108, SP 110 may alternatively be embedded within a chipset (not shown). Chipset may comprise a host bridge/hub system that may couple host processor 102 and host memory 104 to each other and to bus 106. Chipset may also include an I/O bridge/hub system (not shown) that may couple the host bridge/bus system to bus 106. Chipset 208 comprise one or more integrated circuit chips, such as those selected from integrated circuit chipsets commercially available from the Assignee of the subject application (e.g., graphics memory and I/O controller hub chipsets), although other one or more integrated circuit chips may also, or alternatively, be used. Other possibilities for the location of SP 110 may exist.

SP 110 may additionally comprise transmit filter 142 (labeled "TX filter") to perform transmit filtering on packets sent from local application 138 to SP 110, as well as a receive filter 144 (labeled "RX filter") to perform receive filtering on packets sent from remote application 148 sent to SP 110. While transmit filter 142 and receive filter 144 are shown to reside on SP 100, embodiments of the invention are not limited to this implementation. Rather, transmit filter 142 and/or receive filter 144 may be configured from SP 110. For example, transmit filter 142 and/or receive filter 144 may instead reside somewhere outside of SP 110, but still be associated with SP 110. In one embodiment, transmit filter 142 may be part of MAC hardware (not shown) on network device 108. In one embodiment, receive filter 144 may reside on, or otherwise be associated with a port 164.

Host network stack 140 may be associated with a primary IP (internet protocol) address 154 (hereinafter "PIPA"), SP 110 may be associated with an alternate IP address 152 (hereinafter "AIPA"), and ENS 146 may be associated with a primary IP other address 154X (hereinafter "PIPAX"). PIPA 154, PIPAX 154X, AND AIPA 152 may each comprise an IP address.

As used herein, "internet protocol" refers to a protocol for communicating on any internet, including but not limited to the Internet. Therefore, an "IP address" refers to an internet protocol identifier for a computer or device on an internet, which may include the Internet. For example, an internet may comprise the Internet, and an IP address may comprise the Internet Protocol address that may identify a computer or device on the Internet. However, embodiments of the invention are not limited to this, and an IP address may instead be any identifier that may identify a computer or device on any internet. An IP address may be statically assigned, for example by a user or a system such as a configuration server. For example, an IP address may be assigned by a configuration server, such as a DHCP (Dynamic Host Configuration Protocol) server. Of course, other configuration protocol servers may be used to assign an IP address. Alternatively, an IP address may be dynamically assigned.

PIPA 154 and PIPAX 154X may comprise an address that is visible to network, and is accessible over network. In one embodiment, ENS 146 may be configured with the same IP address as host network stack 140 so that PIPAX 154X may be the same value as PIPA 154. For example, when host network stack 140 is configured with an IP address (e.g., using a DHCP server), ENS 146 may be configured with the same IP address. In another embodiment, ENS 146 may be configured with a different IP address as host network stack 140.

AIPA 152 may comprise an address that is not visible to network, and is not accessible over network. In one embodiment, AIPA 152 may be selectable. A selectable IP address refers to an IP address that may be selected, such as from a list of non-routable IP addresses. Non-routable IP addresses may be specified in "Address Allocation for Private Internets", by the Network Working Group of the Internet Engineering Task Force (IETF), RFC 1597, March 1994. Additionally, selectable IP address should be suitable. A suitable non-routable IP address refers to an IP address that is not reserved by system for loopback addressing (i.e., addressing that enables a system to send messages to itself), for example. In another embodiment, AIPA 152 may be dedicated. A dedicated IP address refers to an IP address that may be dedicated to an SP. Dedicated IP address may be a non-routable IP address. Alternatively, a dedicated IP address may be an IP address that is specifically designated for a specific purpose; for example, for use by SP 110.

Furthermore, network device 108 may be associated with a primary DLC (Data Link Control) address 156 (hereinafter "PDLC address"), and SP 110 may be associated with an alternate DLC address 158 (hereinafter "ADLC address"). PDLC address 156 and ADLC address 158 may each comprise a DLC address.

As used herein, "DLC address" refers to a Data Link Control hardware address that may uniquely identify a node in a network. In one embodiment, a DLC address may comprise a MAC address in the MAC layer that is part of the IEEE (Institute of Electrical and Electronics Engineers) 802 LAN (local area network) standard. For example, a packet may comprise two MAC addresses: a source MAC address and a destination MAC address. The source MAC address may identify an initiator of the packet, while the destination MAC address may identify the target of the packet. The IEEE 802 standard is described in "IEEE Standards for local and metropolitan networks: overview and architecture", published December 1990, and is available from IEEE Corporate Communications, 445 Hoes Lane, Piscataway, N.J., 08854. PDLC address 156 may comprise a DLC address that is assigned to network device 108, and ADLC address 158 may comprise a DLC address that is assigned to SP 110. For example, PDLC address 156 may be a MAC (media access control) address that is hardcoded into network device 108.

In one embodiment, ADLC address 158 may be generated. ADLC address 158 may be generated in accordance with a rule. For example, if the DLC address (i.e., PDLC address 156) for the network device 108 is 01:02:03:04:05:0A, ADLC address 158 may be generated in accordance with a rule such as ADLC=PDLC+1, such that ADLC=01:02:03:04:05:0B. In another embodiment, ADLC address 158 may be requested. In this embodiment, a request may be sent to SP 110 to obtain a DLC address corresponding to AIPA 152. In response to the request, a DLC address may be generated and returned. In this second embodiment, ADLC address 158 is not constrained by a rule so that DLC address can be generated in any manner.

Local application 138 may comprise a management application for managing service processor 110 from within system 100. Local application 138 may create one or more packets 150 to forward to SP 110 to be processed by ENS 146. Local application 138 may generate one or more packets 150 addressed to an AIPA 152 and comprising a local application DLC address 134 (hereinafter "LADLC address"). As used herein, "LADLC address" refers to a destination DLC address (e.g., destination MAC address) generated by local application 138, such that if LADLC address 134 matches ADLC address 158, one or more packets 150 may be forwarded to ENS 146 (via SP 110). In this embodiment, one or more packets 150 may be addressed to SP 110, which may forward one or more packets 150 to ENS 146.

Remote application 148 may comprise a management application for managing service processor 110 from outside of system 100, such as over a network. Remote application 148 may create one or more packets 160 to forward to SP 110 to be processed by ENS 146. Remote application 148 may generate one or more packets 160 addressed to a PIPAX 154X, and comprising a remote application DLC address 168 (hereinafter "RADLC address"). As used herein, "RADLC address" refers to a source DLC address (e.g., source MAC address) generated by remote application 148, such that if RADLC address 168 matches ADLC address 158, one or more packets 160 may be dropped since ADLC address 158 is reserved for local application 138 management of SP 110. Dropping one or more packets 160 may prevent entry in table 166 from being overwritten, where the entry may already map AIPA 152 to ADLC 158. In this embodiment, one or more packets 160 may be directly addressed to ENS 146 rather than SP 110.

Network device 108 may be comprised in a circuit card 124 that may be inserted into a circuit card slot 128. For example, network device 108 may comprise a network interface card ("NIC"), or a LAN on motherboard. When circuit card 124 is inserted into circuit card slot 128, PCI bus connector (not shown) on circuit card slot 128 may become electrically and mechanically coupled to PCI bus connector (not shown) on circuit card 124. When these PCI bus connectors are so coupled to each other, circuitry 126B in SP 110 associated with network device 108 of circuit card 124 may become electrically coupled to bus 106. When circuitry 126B is electrically coupled to bus 106, host processor 102 may exchange data and/or commands with circuitry 126B via bus 106 that may permit host processor 102 to control and/or monitor the operation of circuitry 126B.

Circuitry 126A, 126B may comprise one or more circuits to perform one or more operations described herein as being performed by network device driver 132, network device 108, and/or system 100. Circuitry 126A, 126B may be hardwired to perform the one or more operations, and may be generally located on motherboard 118, or may be part of a processor, such as host processor 102. For example, circuitry 126A, 126B may comprise one or more digital circuits, one or more analog circuits, one or more state machines, programmable circuitry, and/or one or more ASIC's (Application-Specific Integrated Circuits). Alternatively, and/or additionally, these operations may be embodied in programs that may perform functions described herein by utilizing components of system 100 described above. For example, circuitry 126A, 126B may execute machine-executable instructions 130 to perform these operations. Alternatively, circuitry 126A, 126B may comprise computer-readable memory 128A, 128B having read only and/or random access memory that may store program instructions, similar to machine-executable instructions 130.

Figure 2:
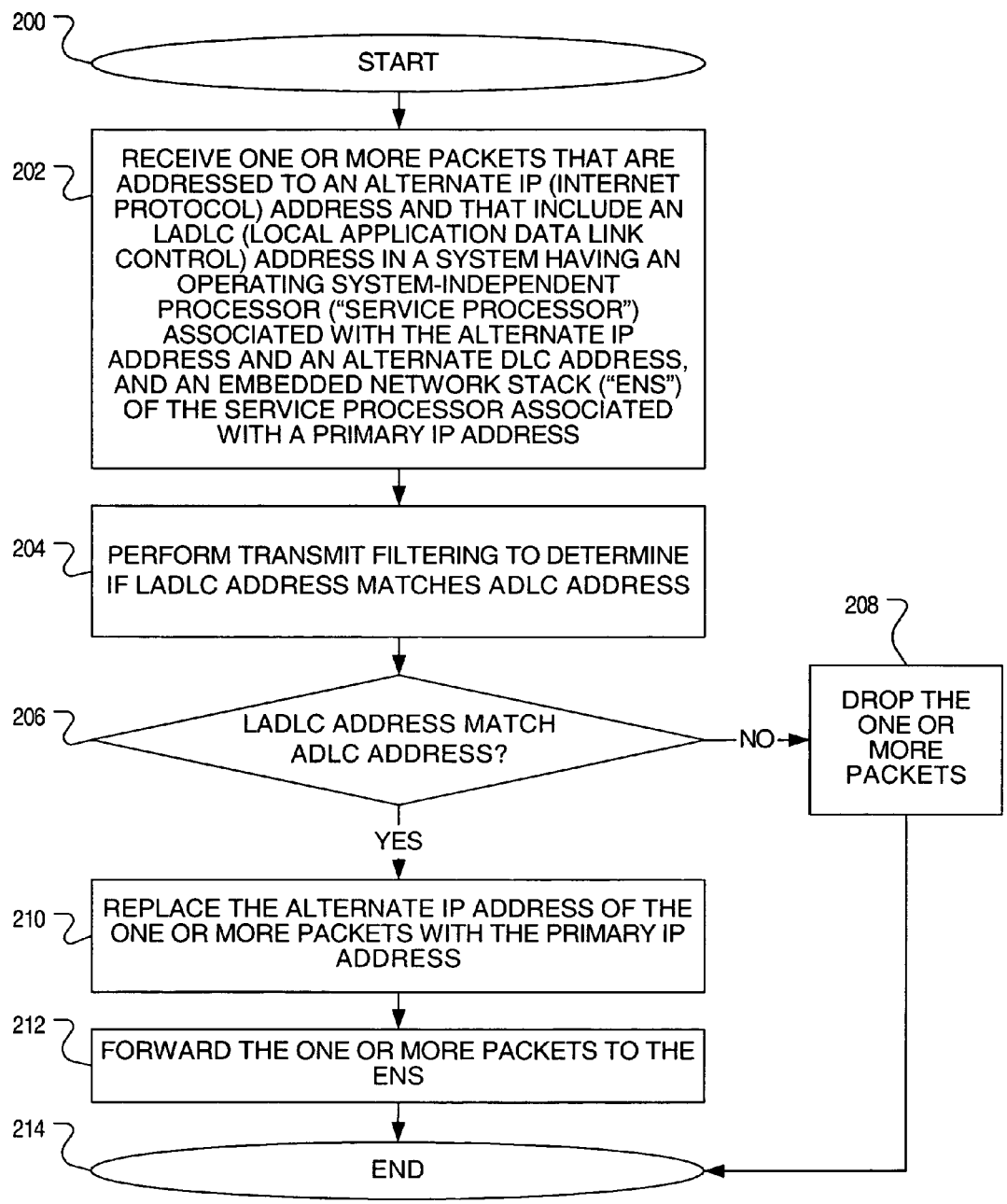
FIG. 2 is a flowchart that illustrates a method in one embodiment.

A method in accordance with one embodiment is illustrated in FIG. 2. Operations described as being performed by specific components herein may generally be performed by system 100. The method begins at block 200 and continues to block 202 where one or more packets 150 may be received that are addressed to an AIPA 152 and that include an LADLC address 134 in a system 100 having an operating system-independent processor ("service processor") 110 associated with the AIPA 152 and an ADLC address 158, and an ENS 146 of the service processor SP 110 associated with a PIPAX 154X.

In one embodiment, transmit filter 142 may receive the one or more packets 150, and one or more packets 150 may be sent from local application 138 to SP 110. For example, HNS 140 may receive from local application 138 one or more packets 150 addressed to AIPA 152. Since one or more packets are not addressed to PIPA 154 of HNS 140, HNS 140 may forward one or more packets 150 to SP 110. Furthermore, SP 110 may program transmit filter 142 so that transmit filter 142 may intercept one or more packets 150 to perform transmit filtering, and to send the one or more packets 150 to SP 110.

In a first embodiment, AIPA 152 of one or more packets 150 may comprise a selectable IP address, and LADLC address 134 of one or more packets 150 may comprise a generated DLC. When local application 138 generates one or more packets 150 to SP 110 over a managed interface, local application 138 may select an IP address addressable to SP 110 (e.g., AIPA 152), and may generate or use an LADLC address 134 addressable to SP 110 (e.g., ADLC address 158). Both AIPA 152 and ADLC address 158 may be known to local application 138. For example, when SP 110 is programmed with AIPA 152, or when ADLC address 158 is generated for SP 110, this information may be made available to system 100 components, including local application 138. Alternatively, local application 138 may know how to generate ADLC address 158.

In a second embodiment, AIPA 152 of one or more packets 150 may comprise a dedicated IP address, and LADLC address 134 of one or more packets 150 may comprise a requested DLC address. When local application 138 generates one or more packets 150 to SP 110 over a managed interface, local application 138 may use an IP address dedicated to SP 110 (e.g., AIPA 152), and may request an LADLC address 134 addressable to SP 110 (e.g., ADLC address 158). AIPA 152 may be known to local application 138, for example, when SP 110 is programmed with AIPA 152. Furthermore, ADLC address 158 may be requested from SP 110. In one embodiment, the request may comprise an ARP (address resolution protocol) request. "ARP" refers to a protocol that converts an internet protocol address into a physical address. An "ARP request" refers to a request to obtain a physical address.

In both embodiments, each AIPA 152 may be associated with an LADLC address 134 so that packets addressed to AIPA 152 may be sent to component having DLC address=LADLC address 134. In one embodiment, local application 138 may create an entry in one of tables 166, where each entry may map AIPA 152 to LADLC address 134. In one embodiment, at least one of tables 166 may be an ARP table. An entry in a table 166 such as an ARP table may enable local application 138 to reuse LADLC address 134 on subsequent transmits without needing to regenerate the LADLC address 134.

Furthermore, each AIPA 152 may be associated with a route to a managed interface so that packets addressed to AIPA 152 may be sent to correct SP 110. As used herein, a "managed interface" refers to a path for communication between a local application and a targeted device. In one embodiment, local application may comprise location application 138, and targeted device may comprise SP 110. For example, if there are multiple targeted devices, such as multiple SPs 110, there may be a corresponding number of managed interfaces, such that local application 138 may need to specify to which of the multiple targeted devices the location application 138 is sending one or more packets 150.

At block 204, transmit filtering may be performed on the one or more packets 150 to determine if LADLC address 134 matches ADLC address 158. While local application 138 may generate one or more packets 150 appropriately addressed to ENS 146 (e.g., AIPA 152, ADLC address 158), transmit filter 142 checks all packets to ensure that all packets addressed to ADLC address 158 may be forwarded to ENS 146 rather than sent out over the network.

At block 206, if LADLC address 134 matches ADLC address 158, the method may continue to block 210. If at block 206, LADLC address 134 does not match ADLC address 158, the method may continue to block 208.

At block 208, the one or more packets 150 may be dropped. If LADLC address 134 does not match ADLC address 158, then the one or more packets 150 may not be forwarded to ENS 146. The method may continue to block 214.

At block 210, the AIPA 152 of the one or more packets 150 may be replaced with the PIPAX 154X. This is done so that the ENS 146 may recognize one or more packets 150 as packets to be processed by ENS 146. The method may continue to block 212.

At block 212, the one or more packets 150 may be forwarded to the ENS 146. ENS 146 may continue with packet processing by extracting data from one or more packets 150. The method may continue to block 214.

The method ends at block 214.

Figure 3:
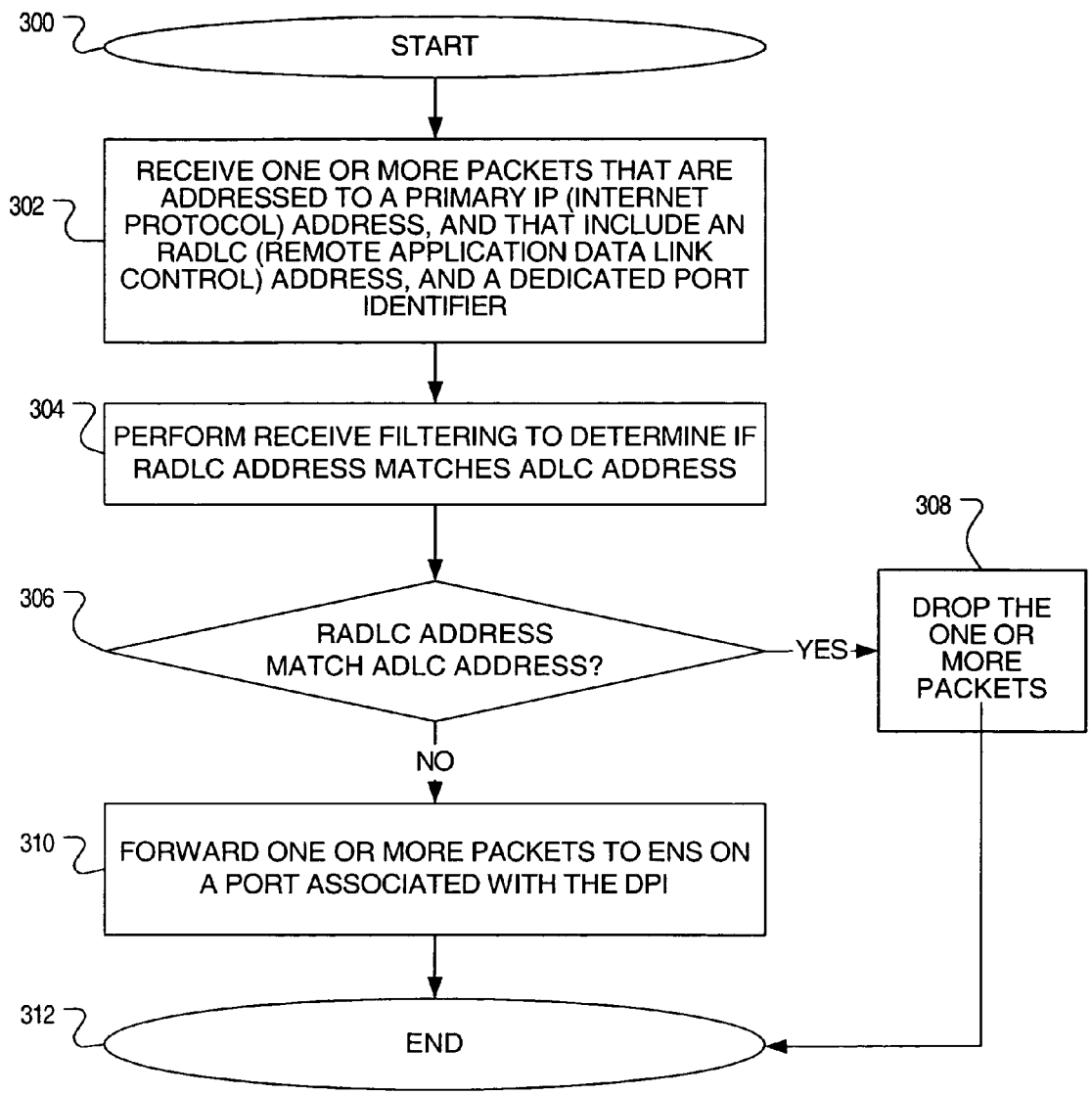
FIG. 3 is a flowchart that illustrates a method in another embodiment.

FIG. 3 is a flowchart illustrating another method according to one embodiment. The method begins at block 300 and continues to block 302 where one or more packets 160 may be received that are addressed to a PIPAX 154X, and that include an RADLC address 156, and a dedicated port identifier 162 (hereinafter "DPI"). "DPI" refers to an identifier of a port on SP via which a specific SP may be accessed. In one embodiment, one or more packets 160 may be forwarded by remote application 148, and may be received by receive filter 144 of SP 110.

At block 304, receive filtering may be performed on the one or more packets 160 to determine if RADLC address 168 matches ADLC address 158. Receive filtering may comprise ensuring that all packets addressed to PIPA 154 sent on DPI 162 may be forwarded to ENS 146. Receive filtering may further comprise ensuring that all packets 160 in which RADLC address 168 matches ADLC address 158 may be dropped since ADLC address 158 is reserved for local management of packets (i.e., one or more packets 150 sent from local application 138). DPI may be recognized by receive filter 144. Receive filter may prevent frames 160 having a destination DLC=PDLC 156 from being sent to host network stack 140, and from operating system 136 overwriting entry in table 166 that maps AIPA 152 to ADLC 158.

At block 306, if RADLC address 168 does not match ADLC address 158, the method may continue to block 310. If at block 306 RADLC address 168 matches ADLC address 158, the method may continue to block 308.

At block 308, one or more packets 160 may be dropped. If RADLC address 168 does not match ADLC address 158, then the one or more packets 160 should not be forwarded to ENS 146. The method may continue to block 312.

In on embodiment, operations 304, 306, and 308 may be performed by receive filter 144.

At block 310, one or more packets 160 may be forwarded to ENS 146 on a port associated with the DPI. A port associated with the DPI refers to a port which may be identified by the DPI. In one embodiment, receive filtering may comprise forwarding the one or more packets 160 addressed to PIPAX 154X received on port=DPI 162 directly to ENS 146, and DLC address checking may be performed on ENS 146. ENS 146 may then continue with packet processing by extracting data from one or more packets 160. The method may continue to block 312.

The method ends at block 312.

CONCLUSION

Therefore, in one embodiment, a method may comprise receiving one or more packets that are addressed to an alternate IP (Internet Protocol) address and that include LADLC (local application data link control) address in a system having an operating system-independent processor ("service processor") associated with the alternate IP address and an alternate DLC address, and an embedded network stack ("ENS") of the service processor associated with a primary IP address; performing filtering to determine if the LADLC address matches the alternate DLC address; and if the LADLC address matches the alternate DLC address, then replacing the alternate IP address of the one or more packets with the primary IP address, and forwarding the one or more packets to the ENS.

Embodiments of the invention enable applications local and remote to a system to access an embedded network stack associated with an operating system-independent processor, without the need for additional proprietary protocols and/or drivers for accessing the embedded network stack. Instead, the embedded network stack is used. Furthermore, embodiments of the invention enable secure communication with the local host through the use of alternate IP and DLC addresses, which may eliminate the need for dedicated interfaces, and can instead provide high bandwidth communication.

In the foregoing specification, various embodiments of the invention have been described. It will, however, be evident that various modifications and changes may be made to these embodiments without departing therefrom. The specification and drawings are, accordingly, to be regarded in an illustrative rather than a restrictive sense.

What is claimed is:

1. A method comprising:
   receiving one or more packets that are addressed to an alternate IP (internet protocol) address and that include an LADLC (local application data link control) address in a system having an operating system-independent processor ("service processor") associated with the alternate IP address and an alternate DLC address, and an embedded network stack ("ENS") of the service processor associated with a primary IP address;
   performing filtering to determine if the LADLC address matches the alternate DLC address; and
   if the DLC address matches the alternate LADLC address, then:
      replacing the alternate IP address of the one or more packets with the primary IP address; and
      forwarding the one or more packets to the ENS.

2. The method of claim 1, wherein if the LADLC address does not match the alternate DLC address, then dropping the one or more packets.

3. The method of claim 1, wherein the alternate DLC address is requested from the service processor.

4. The method of claim 1, wherein the alternate DLC address is generated in accordance with a rule.

5. The method of claim 1, wherein the primary IP address is different from an IP address assigned to a host networking stack of the system.

6. The method of claim 1, additionally comprising associating the alternate IP address with the LADLC address.

7. The method of claim 6, wherein said associating the alternate IP address with the LADLC address comprises creating an entry in an ARP (address resolution protocol) table.

8. The method of claim 7, wherein the system comprises at least one more service processor, the method additionally comprising creating a route entry that directs the one or more packets addressed to the alternate IP address to a specified service processor of the at least one more service processor.

9. The method of claim 1, additionally comprising:
   receiving one or more packets that are addressed to the primary IP address and that include an RADLC (remote application data link control) address, and a dedicated port identifier (DPI);
   performing filtering to determine if the RADLC address matches the alternate DLC address; and
   if the RADLC address does not match the alternate DLC address, then forwarding the one or more packets to the ENS on a port associated with the DPI.

10. The method of claim 9, wherein if the RADLC address matches the alternate DLC address, then dropping the one or more packets.

11. An apparatus comprising:
    circuitry to:
    receive one or more packets that are addressed to an alternate IP (internet protocol) address and that include an LADLC (local application data link control) address in a system having an operating system-independent processor ("service processor") associated with the alternate IP address and an alternate DLC address, and an embedded network stack ("ENS") of the service processor associated with a primary IP address;
    perform filtering to determine if the LADLC address matches the alternate DLC address; and
    if the DLC address matches the alternate LADLC address, then the circuitry to:
       replace the alternate IP address of the one or more packets with the primary IP address; and
       forward the one or more packets to the ENS.

12. The apparatus of claim 11, wherein if the LADLC address does not match the alternate DLC address, then the circuitry to drop the one or more packets.

13. The apparatus of claim 11, the circuitry to additionally associate the alternate IP address with the LADLC address.

14. The apparatus of claim 13, wherein the circuitry additionally associates the alternate IP address with the LADLC address by creating an entry in an ARP (address resolution protocol) table.

15. The apparatus of claim 14, wherein the system comprises at least one more service processor, the circuitry to additionally create a route entry that directs the one or more packets addressed to the alternate IP address to a specified service processor of the at least one more service processor.

16. The apparatus of claim 11, additionally comprising circuitry to:
    receive one or more packets that are addressed to the primary IP address and that include an RADLC (remote application data link control) address, and a dedicated port identifier (DPI);
    perform filtering to determine if the RADLC address matches the alternate DLC address; and
    if the RADLC address does not match the alternate DLC address, then the circuitry to forward the one or more packets to the ENS on a pod associated with the DPI.

17. The apparatus of claim 16, wherein if the RADLC address matches the alternate DLC address, then the circuitry to drop the one or more packets.

18. A system comprising:
    a circuit board that includes a circuit card slot; and
    a network interface card ("NIC") coupled to the circuit board via the circuit card slot, the NIC having circuitry to:
    receive one or more packets that are addressed to an alternate IP (internet protocol) address and that include an LADLC (local application data link control) address in a system having an operating system-independent processor ("service processor") associated with the alternate IP address and an alternate DLC address, and an embedded network stack ("ENS") of the service processor associated with a primary IP address;
    perform filtering to determine if the LADLC address matches the alternate DLC address; and
    if the DLC address matches the alternate LADLC address, then the circuitry to:
       replace the alternate IP address of the one or more packets with the primary IP address; and
       forward the one or more packets to the ENS.

19. The system of claim 18, wherein if the LADLC address does not match the alternate DLC address, then the circuitry to drop the one or more packets.

20. The system of claim 18, the circuitry to additionally associate the alternate IP address with the LADLC address.

21. The system of claim 20, wherein the circuitry additionally associates the alternate IP address with the LADLC address by creating an entry in an ARP (address resolution protocol) table.

22. The system of claim 21, wherein the system comprises at least one more service processor, the circuitry to additionally create a route entry that directs the one or more packets addressed to the alternate IP address to a specified service processor of the at least one more service processor 23. The system of claim 18, additionally comprising circuitry to:
   receive one or more packets that are addressed to the primary IP address and that include an RADLC (remote application data link control) address, and a dedicated port identifier (DPI);
   perform filtering to determine if the RADLC address matches the alternate DLC address; and
   if the RADLC address does not match the alternate DLC address, then the circuitry to forward the one or more packets to the ENS on a port associated with the DPI.

24. The system of claim 23, wherein if the RADLC address matches the alternate DLC address, then the circuitry to drop the one or more (Original) packets.

25. An article comprising a machine-readable storage medium having machine-accessible instructions, the instructions when executed by a machine, result in the following:
   receiving one or more packets that are addressed to an alternate IP (internet protocol) address and that include an LADLC (local application data link control) address in a system having an operating system-independent processor ("service processor") associated with the alternate IP address and an alternate DLC address, and an embedded network stack ("ENS") of the service processor associated with a primary IP address;
   performing filtering to determine if the LADLC address matches the alternate DLC address; and
   if the DLC address matches the alternate LADLC address, then:
      replacing the alternate IP address of the one or more packets with the primary IP address; and
      forwarding the one or more packets to the ENS.

26. The article of claim 25, wherein if the LADLC address does not match the alternate DLC address, then the instructions result in dropping the one or more packets.

27. The article of claim 25, the instructions additionally result in associating the alternate IP address with the LADLC address.

28. The article of claim 27, wherein the system comprises at least one more service processor, the instructions additionally result in creating a route entry that directs the one or more packets addressed to the alternate IP address to a specified service processor of the at least one more service processor.

29. The article of claim 25, the instructions additionally result in:
   receiving one or more packets that are addressed to the primary IP address and that include an RADLC (remote application data link control) address, and a dedicated port identifier (DPI);
   performing filtering to determine if the RADLC address matches the alternate DLC address; and
   if the RADLC address does not match the alternate DLC address, then for-warding the one or more packets to the ENS on a port associated with the DPI.

30. The article of claim 29, wherein if the RADLC address matches the alternate DLC address, then the instructions result in dropping the one or more packets.

* * * * *